3,849,562
METHOD OF TREATING NEPHROSIS
Brian Peter Richardson, Basel, Switzerland, assignor to Sandoz Ltd. (also known as Sandoz AG), Basel, Switzerland
No Drawing. Filed Mar. 15, 1973, Ser. No. 341,509
Int. Cl. A61k 27/00
U.S. Cl. 424—261                                        3 Claims

ABSTRACT OF THE DISCLOSURE

This invention concerns a novel method of increasing urine volume and urine pH, which comprises inhibiting prolactin by administering a prolactin inhibiting amount of a prolactin-inhibitor selected from 2-bromo-α-ergocryptine, ergocornine, 9,10-dihydroergocornine and L-dopa.

---

This invention concerns a novel method of increasing urine volume and urine pH (or urine electrolyte values, particularly sodium and potassium values). It has been found that urine volume and urine pH (or urine electrolyte values), may be increased by inhibiting prolactin, e.g. by oral or parenteral administration of a prolactin-inhibitor such as 2 - bromo-α-ergocryptine, ergocornine, 9,10-dihydroergocornine or L-dopa.

In tests on animals (rats) which normally suffer from nephrosis or a deposition of urine proteins (albumines and globulines) in kidney tubules, it has been observed that such deposition is significantly less pronounced following on treatment of the test animals with a prolactin inhibitor, particularly with 2-bromo-α-ergocryptine. This inhibition or lowering of the deposition of urinary proteins is attributed to an increased solubility of such proteins which is in turn attributed to one or more of several factors, notably increase in urine volume, and increase in urine pH (or increase in urine sodium and potassium values).

Compositions which may be employed to increase urine volume and urine pH comprise the prolactin-inhibitor, in association with carrier materials such as ascorbic acid, acetic acid, ethanol and water for solutions, and talc, lactose, maize starch, polyvinyl pyrrolidone, magnesium stearate for solid forms.

The compositions may furthermore comprise an antibiotic or a sulfonamide such as sulfadiazine, a trisulfapyrimidine, sulfisoxazol, sulfisomidine, sulfamethizol or sulfacetamide. Where infections are present, e.g. infections of the kidney, it may be advantageous to employ compositions comprising the prolactin inhibitor and a quantity of antibiotic or sulfonamide.

The amount of prolactin inhibitor employed to achieve increased urine volume and urine pH will of course vary depending on the prolactin inhibiting effect of the particular prolactin inhibitor being employed, the mode of administration, and the extent of increased urine volume and urine pH desired. However, with the ergot alkaloids, 2-bromo-α-ergocryptine, ergocornine and 9,10-dihydroergocornine satisfactory prolactin inhibiting effects are obtained at a daily dose of from about 0.01 to about 3.0 milligrams per kilogram animal body weight, which may be administered in divided doses 2 to 4 times a day. In the case of 2-bromo-α-ergocryptine, satisfactory prolactin inhibiting effects are obtained at a daily dose of from about 0.03 to about 1 milligram per kilogram animal body weight. In the case of L-dopa, satisfactory prolactin-inhibiting effects are obtained at a daily dose of from about 5 to about 45 milligrams per kilogram animal body weight, which may be administered in divided doses up to 6 times daily. For larger mammals, daily doses of from about 0.5 to about 15 milligrams of the ergot alkaloid prolactin inhibitors produce satisfactory results, and unit dosage forms contain from about 0.1 to about 5 milligrams of the ergot alkaloid in association with carrier materials such as mentioned. A unit dosage form suitable for parenteral administration may, for example, contain about 1 milligram of the ergot alkaloid, and a unit dosage form suitable for oral administration may contain about 3 milligrams of the ergot alkaloid. For larger mammals, oral daily doses of from about 750 to about 3000 milligrams of L-dopa produce satisfactory results, this dose for example being administered in divided doses from 3 times to 6 times daily (e.g. from three 250 milligram doses to six 500 milligram doses daily).

Where infections are present, e.g. infections of the kidney, compositions additionally comprising an antibiotic or sulfonamide may be employed. The amount of antibiotic or sulfonamide employed would in such cases generally be as explained in the literature, e.g. an oral dose 1 to 4 grams daily of sulfadiazine or sulfisoxazol, an oral dose of 1 to 2 grams daily of sulfisomidine, or an oral dose or 0.25 to 0.5 grams daily of sulfamethizol. The antibiotic or sulfonamide may, however, be administered separately of the prolactin inhibitor.

The increase in urine volume and urine pH achieved by the method of the invention can for example be employed to inhibit urine protein (albumines or globulines) deposit in kidney tubules, particularly in conditions where protein deposits or casts already exist in the tubules such as in conditions of nephrosis or renal failure, especially chronic renal failure. Thus, degenerative progression of renal failure may for example be inhibited, particularly where renal failure is in its early stages and complete blockage of kidney tubules following urine protein deposition has not yet taken place. The increase in urine volume achieved by the method of the invention can also find other applications, for example where it is desired to reduce the quantity of water in the blood, e.g. in conditions of edema.

The following Examples set out details of composition forms suitable for use in the method of the invention, it being understood that further preparations suitable for use in the method may be prepared by conventional techniques.

EXAMPLE 1

Ergot alkaloid ampoule

Ampoules suitable for parenteral administration and containing the ingredients indicated below may be produced in known manner. The ampoules may be used in the treatment of nephropathies or chronic nephritis at a dose of 1 to 5 ampoules daily.

| Ingredients: | Weight, g. |
|---|---|
| Ergot alkaloid | 0.000752 |
| Ascorbic acid | 0.00050 |
| Acetic acid concentrated ad pH 2.9, q.s. | |
| 94% ethanol | 0.120 |
| Water for injection up to | 0.9760 |
| Equals (ml.) | 1.0 |

EXAMPLE 2

Ergot alkaloid tablet

Tablets suitable for enteral administration and containing the ingredients indicated below may be produced in known manner. The tablets may be used in the treatment of nephropathies or chronic nephritis at a dose of 3×1 tablet daily.

| Ingredients: | Weight, mg. |
|---|---|
| Ergot alkaloid | 2.87 |
| Lactose | 96.18 |
| Maize starch | 14.00 |
| Polyvinyl pyrrolidone | 5.00 |
| Magnesium stearate | 0.70 |
| Talc | 1.20 |
| Colouring agents, if desired | |
| | 120 |

EXAMPLE 3

Ergot alkaloid capsule

Capsules suitable for enteral administration and containing the ingredients described below may be produced in known manner. The capsules may be used in the treatment of nephropathies or chronic nephritis at a dose of 3×1 capsules daily.

| Ingredients: | Weight, mg. |
|---|---|
| Ergot alkaloid | 3.00 |
| Lactose | 105.00 |
| Maize starch | 20.00 |
| Talc | 4.50 |
| Erosil | 1.00 |
| Magnesium stearate | 1.50 |
| Colouring agents, if desired | |
| | 135 |

In each of the above Examples, the ergot alkaloid comprises any one of 2-bromo-α-ergocryptine, ergocornine or 9,10-dihydroergocornine, which ergot alkaloid is conveniently in salt form, e.g. the methane sulfonate. The preferred ergot alkaloid employed in each of the Examples is 2-bromo-α-ergocryptine methane sulfonate.

The tablet described in Example 2 may additionally contain a suitable amount of antibiotic or sulfonamide such as described to achieve doses of antibiotic or sulfonamide as explained in the literature. Similar considerations apply to the capsule of Example 3. Such tablets or capsules, additionally containing antibiotic or sulfonamide, may be employed where infections are present, e.g. infections of the kidney.

Examples of compositions comprising L-dopa, suitable for administration of from about 750 to about 3000 milligrams daily divided doses of 3 to 6 times a day are described in the literature. Such compositions may be associated with antibiotic or sulfonamide in a manner analogous to that described above in relation to the ergot alkaloid prolactin-inhibitors.

What is claimed is:

1. A method of treating nephrosis which comprises administering to a mammal in need of said treatment an amount effective for the treatment of nephrosis of 2-bromo-α-ergocryptine.

2. A method according to Claim 1, wherein from about 0.03 to about 1 milligram per kilogram animal body weight of 2-bromo-α-ergocryptine is administered.

3. A method according to Claim 1, wherein from about 0.5 to about 15 milligrams of 2-bromo-α-ergocryptine is administered.

References Cited

Chemical Abstracts, 75:108252w (1971).

JEROME D. GOLDBERG, Primary Examiner

U.S. Cl. X.R.

424—319